US011955737B2

(12) United States Patent
Ohira et al.

(10) Patent No.: US 11,955,737 B2
(45) Date of Patent: Apr. 9, 2024

(54) ANTENNA MODULE AND COMMUNICATION DEVICE CARRYING THE SAME

(71) Applicants: National University Corporation Saitama University, Saitama (JP); Murata Manufacturing Co., Ltd., Nagaokakyo (JP)

(72) Inventors: Masataka Ohira, Saitama (JP); Kaoru Sudo, Nagaokakyo (JP); Yoshinori Taguchi, Nagaokakyo (JP)

(73) Assignees: NATIONAL UNIVERSITY CORPORATION SAITAMA UNIVERSITY, Saitama (JP); MURATA MANUFACTURING CO., LTD., Nagaokakyo (JP)

( * ) Notice: Subject to any disclaimer, the term of this patent is extended or adjusted under 35 U.S.C. 154(b) by 161 days.

(21) Appl. No.: 17/741,447

(22) Filed: May 11, 2022

(65) Prior Publication Data

US 2022/0271433 A1 Aug. 25, 2022

Related U.S. Application Data

(63) Continuation of application No. PCT/JP2020/027594, filed on Jul. 16, 2020.

(30) Foreign Application Priority Data

Nov. 13, 2019 (JP) ................................ 2019-205205

(51) Int. Cl.
*H01Q 9/04* (2006.01)
*H01Q 1/22* (2006.01)
(Continued)

(52) U.S. Cl.
CPC ......... *H01Q 9/0485* (2013.01); *H01Q 1/2283* (2013.01); *H01Q 15/24* (2013.01); *H01Q 19/13* (2013.01)

(58) Field of Classification Search
CPC ...... H01Q 21/065; H01Q 9/0414; H01Q 1/38; H01Q 9/0407; H01Q 1/243; H01Q 5/378;
(Continued)

(56) References Cited

U.S. PATENT DOCUMENTS 10,062,629 B2 * 8/2018 Maxim ............. H01L 21/02266
11,024,955 B2 * 6/2021 Onaka ....................... H01P 3/08
(Continued)

FOREIGN PATENT DOCUMENTS

JP 4-252522 A 9/1992
JP 4-297104 A 10/1992
(Continued)

OTHER PUBLICATIONS

International Search Report dated Sep. 24, 2020, received for PCT Application PCT/JP2020/027594, Filed on Jul. 16, 2020, 5 pages including English Translation.

*Primary Examiner* — Vibol Tan
(74) *Attorney, Agent, or Firm* — XSENSUS LLP

(57) ABSTRACT

An antenna module includes: a radiating element and a filter device including a plurality of resonators. The plurality of resonators include a first resonator and a second resonator, the second resonator being disposed at a final stage. The first resonator and the second resonator are each electrically coupled to the radiating element. A degree of a coupling of the resonator and the radiating element is weaker than a degree of a coupling of the resonator and the radiating element.

20 Claims, 7 Drawing Sheets

(51) Int. Cl.
*H01Q 15/24* (2006.01)
*H01Q 19/13* (2006.01)

(58) Field of Classification Search
CPC .... H01Q 9/0457; H01Q 9/0485; H01Q 1/241; H01Q 1/521; H01Q 19/13; H01Q 9/0442; H01P 1/20381; H01P 7/08; H01P 1/2013; H01P 1/203
See application file for complete search history.

(56) References Cited

U.S. PATENT DOCUMENTS

| | | | | |
|---|---|---|---|---|
| 11,355,851 | B2 * | 6/2022 | Gianesello | H01L 23/66 |
| 11,450,942 | B2 * | 9/2022 | Murata | H01Q 1/2283 |

FOREIGN PATENT DOCUMENTS

| | | | |
|---|---|---|---|
| JP | 10-335926 | A | 12/1998 |
| JP | 2007-318271 | A | 12/2007 |
| JP | 2013-48396 | A | 3/2013 |

* cited by examiner

ANTENNA MODULE AND COMMUNICATION DEVICE CARRYING THE SAME

CROSS-REFERENCE TO RELATED APPLICATIONS

The present application is a continuation application of International Patent Application No. PCT/JP2020/027594, filed Jul. 16, 2020, which claims priority to Japanese patent application JP 2019-205205, filed Nov. 13, 2019, the entire contents of each of which being incorporated herein by reference.

TECHNICAL FIELD

The present disclosure relates to an antenna module and a communication device carrying the same, and, more particularly, to a structure for size reduction of an antenna module incorporating a filter.

BACKGROUND ART

Japanese Patent Laid-Open No. 2007-318271 (PTL 1) discloses a filter circuit formed of four resonant elements. PTL 1 discloses disposing a coupling device to control uncontrolled cross-coupling present between two resonant elements of the filter circuit, thereby reducing the amount of coupling of the two resonant elements and improving filter characteristics.

CITATION LIST

Patent Literature

[PTL 1] Japanese Patent Laid-Open No. 2007-318271

SUMMARY

Technical Problems

In recent years, a wireless communication device such as smartphone or a mobile phone is proposed, which includes a front end circuit in which an antenna device and a filter are integrated together. There is still an increasing demand for size reduction of such a wireless communication device, and, accordingly, size reduction of the front end circuit.

In general, in the antenna device incorporating the filter, radiating element characteristics and filter characteristics may be tuned individually. However, while the individual elements are optimized individually, the antenna characteristics, as a whole, when the elements are combined, may not provide desired characteristics.

The present disclosure is made to solve the above-identified, and other problems, and an aspect of the present disclosure is to achieve an antenna module incorporating a filter, having a reduced size and improved antenna characteristics.

Solutions to Problems

An antenna module according to a certain aspect of the present disclosure includes: a radiating element; and a filter device that includes a plurality of resonators. The plurality of resonators include a first resonator and a second resonator, the second resonator being disposed at a final stage of the filter device. The first resonator and the second resonator are each electrically coupled to the radiating element. A degree of a coupling between the first resonator and the radiating element is weaker than a degree of a coupling between the second resonator and the radiating element.

An antenna module according to another aspect of the present disclosure includes: a radiating element; and a filter device includes a plurality of resonators. The plurality of resonators includes a first resonator and a second resonator, the second resonator being disposed at a final stage of the filter device. The first resonator is wirelessly, electromagnetically coupled to the radiating element via a vertical section of a via. The second resonator is directly connected to the radiating element by another vertical section of another via.

An antenna module according to still another aspect of the present disclosure includes: a radiating element; a filter device that includes a plurality of resonators; and a ground electrode. The ground electrode is disposed between the radiating element and the filter device, facing the radiating element. The plurality of resonators includes a first resonator and a second resonator, the second resonator being disposed at a final stage. The first resonator is wirelessly, electromagnetically coupled to the radiating element via a first slot formed in the ground electrode, and the second resonator is wirelessly, electromagnetically coupled to the radiating element via a second slot formed in the ground electrode. The first slot has a smaller size than the second slot.

Advantageous Effects of Disclosure

The antenna module according to the present disclosure includes the filter device including multiple resonators in which the resonator (the second resonator) at the final stage as well as other resonator (the first resonator) are coupled to the radiating element, wherein a degree of coupling of the first resonator and the radiating element is weaker than a degree of coupling of the second resonator and the radiating element. With such a configuration, the number of stages included in the filter device can be reduced by using the radiating element as part of the resonator of the filter device. This achieves an antenna module having a reduced size and improved antenna characteristics.

DESCRIPTION OF EMBODIMENTS

Hereinafter, embodiments according to the present disclosure will be described in detail, with reference to the accompanying drawings. Note that the same reference sign is used to refer to the same or like parts, and the description thereof will not be repeated.

Embodiment 1

(Basic Configuration of Communication Device)

Figure 1:
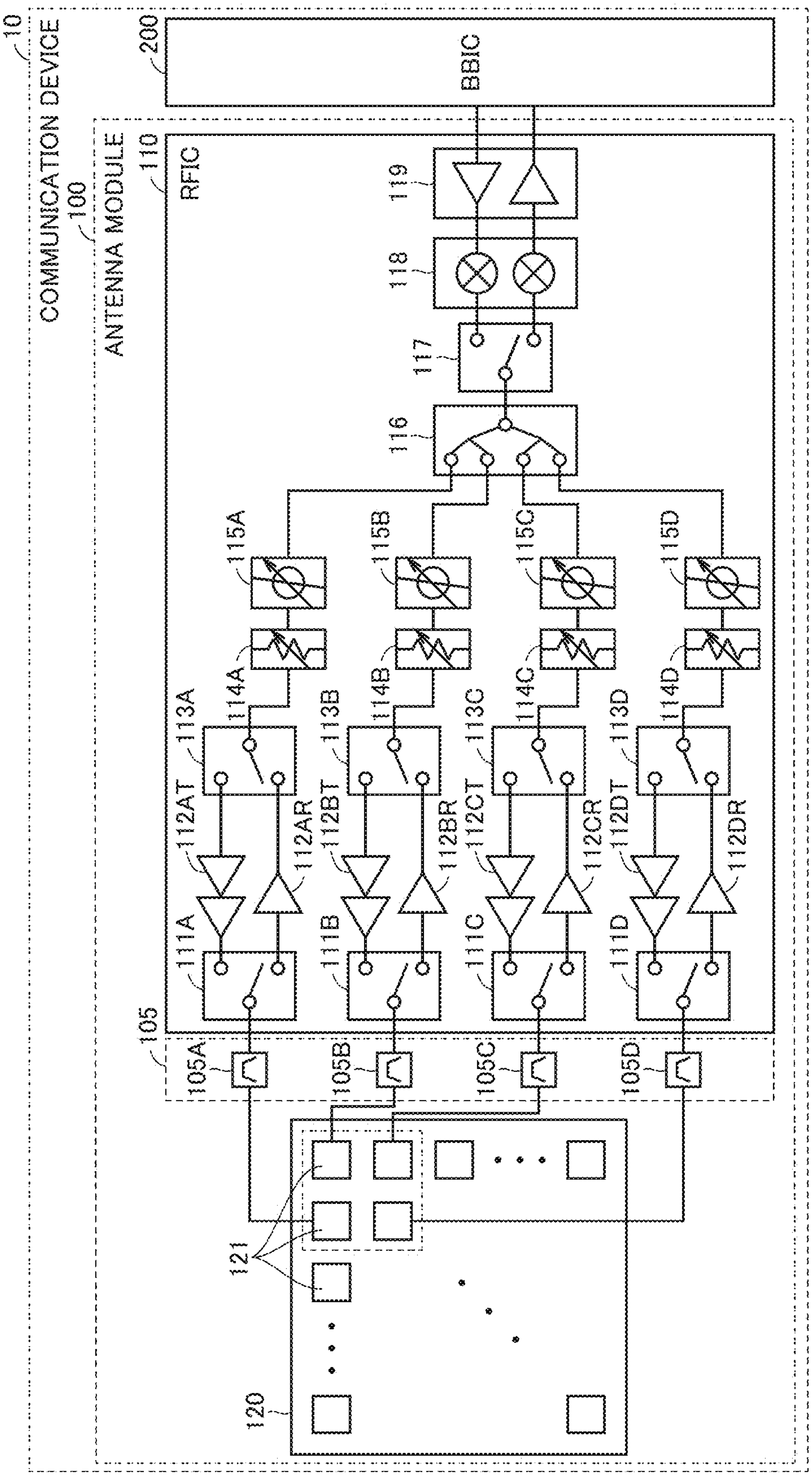
FIG. 1 is a block diagram of a communication device to which an antenna module according to Embodiment 1 of the present disclosure is applied.

FIG. 1 is one example of a block diagram of a communication device 10 to which an antenna module 100 according to Embodiment 1 is applied. The communication device 10 is, for example, a mobile phone, a mobile terminal such as smartphone or a tablet, or a personal computer including communication capabilities. The radio wave frequency range of the antenna module 100 according to the present embodiment is, as one example, a millimeter wave band having a center frequency of 28 GHz, 39 GHz, and 60 GHz, as well as any other frequency between 25 GHz and 300 GHz, for example. However, radio waves having other frequency ranges are also applicable. Note that the following example will be described with reference to a pass band (27 to 29 GHz) whose bandwidth has a center frequency of 28 GHz.

Referring to FIG. 1, the communication device 10 is a multi-band transceiver that includes the antenna module 100, and a BBIC (baseband integrated circuit) 200 forming a baseband signal processing circuit. The antenna module 100 includes: an RFIC (radio-frequency integrated circuit) 110, which is one example of a power feeding circuit; an antenna device 120; and a filter device 105. The communication device 10 up-converts a signal, transmitted from the BBIC 200 to the antenna module 100, into a high-frequency signal at the RFIC 110, and emits the high-frequency signal from the antenna device 120 via the filter device 105. The communication device 10 also transmits a high-frequency signal, received by the antenna device 120, to the RFIC 110 via the filter device 105, the RFIC 110 down-converts the high-frequency signal, and the BBIC 200 processes a signal obtained by the down-conversion.

For ease of illustration, FIG. 1 only shows configurations corresponding to four radiating elements 121, among multiple radiating elements 121 constituting the antenna device 120, and configurations corresponding to the other radiating elements 121 having the same configuration as the four radiating element 121 are omitted. While FIG. 1 shows an example in which the antenna device 120 is formed of multiple radiating element 121 arranged in a two-dimensional array, the antenna device 120 may be formed of multiple radiating element 121 arranged in a one-dimensional array. In Embodiment 1, the radiating element 121 is a patch antenna having a generally-square plate shape.

The RFIC 110 includes switches 111A, 111B, 111C, 111D, 113A, 113B, 113C, 113D, and 117, power amplifiers 112AT, 112BT, 112CT, and 112DT, low-noise amplifiers 112AR, 112BR, 112CR, and 112DR, attenuators 114A, 114B, 114C, and 114D, phase shifters 115A, 115B, 115C, and 115D, a signal multiplexer/demultiplexer 116, a mixer 118, and an amplifier circuit 119.

In order to transmit a high-frequency signal, the switches 111A to 111D and 113A to 113D are switched to the power amplifiers 112AT to 112DT, and the switch 117 is connected to a transmitter amplifier included in the amplifier circuit 119. In order to receive a high-frequency signal, the switches 111A to 111D and 113A to 113D are switched to the low-noise amplifiers 112AR to 112DR, and the switch 117 is connected to a receiver amplifier included in the amplifier circuit 119.

The signal transmitted from the BBIC 200 is amplified by the amplifier circuit 119 and up-converted by the mixer 118. A transmission signal, which is the up-converted high-frequency signal, is demultiplexed by the signal multiplexer/demultiplexer 116 into four signals. The four demultiplexed signals pass through four signal paths and are fed to different radiating elements 121. At this time, the phase shift degrees of the phase shifters 115A to 115D disposed on the respective signal paths are individually tuned, thereby allowing tuning of the directivity of the antenna device 120.

The reception signals, which are high-frequency signals respectively received by the radiating elements 121, pass through four different signal paths, respectively, and are multiplexed by the signal multiplexer/demultiplexer 116. The multiplexed reception signals are down-converted by the mixer 118, amplified by the amplifier circuit 119, and then transmitted to the BBIC 200.

The filter device 105 includes filters 105A, 105B, 105C, and 105D. The filters 105A to 105D are connected to the switches 111A to 111D, respectively, included in the RFIC 110. The filters 105A to 105D have capabilities of attenuating signals that have particular frequency ranges. The filters 105A to 105D may be band-pass filters, high-pass filters, low-pass filters, or a combination thereof. The high-frequency signals output from the RFIC 110 pass through the filters 105A to 105D, and are supplied to corresponding radiating elements 121.

In the case of a high-frequency ("high-frequency" in this context is radio frequency, RF) signal in the millimeter wave band, the longer the transmission line is, the more easily a noise component is mixed into the RF signal. Because of this, preferably, the filter device 105 and the radiating element 121 have a small distance therebetween. In other words, the radiating element 121 can be prevented from emitting an undesired wave by passing the RF signal through the filter device 105 immediately before being emitted from the radiating element 121. Undesired waves can also be removed from the reception signals by passing the RF signals through the filter device 105 immediately after being received by the radiating elements 121.

While FIG. 1 shows the filter device 105 and the antenna device 120 separately, it should be noted that, in the present disclosure, the filter device 105 is formed within the antenna device 120 as described below.

The RFIC 110 is formed as, for example, an integrated circuit part of one chip that includes the circuit structure above. Alternatively, devices (switches, power amplifiers, low-noise amplifiers, attenuators, phase shifters) corresponding to the respective radiating elements 121 included in the RFIC 110 may be formed as integrated circuit parts of one chip for each radiating element 121.

(Configuration of Antenna Module)

Figure 2:
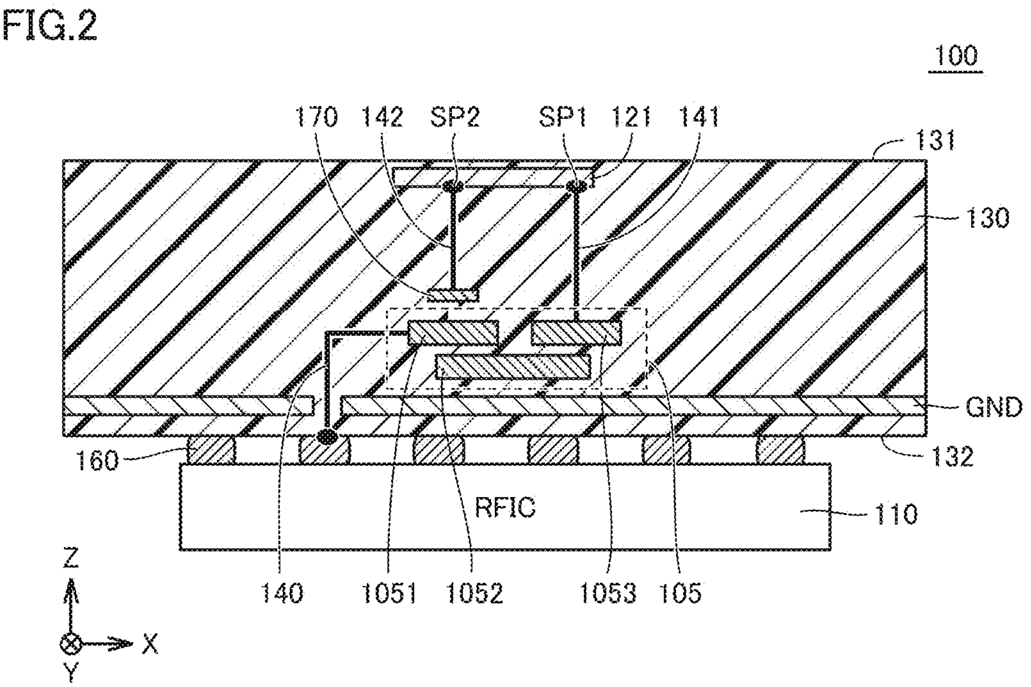
FIG. 2 is a side see-through view of the antenna module of FIG. 1.
Figure 3:
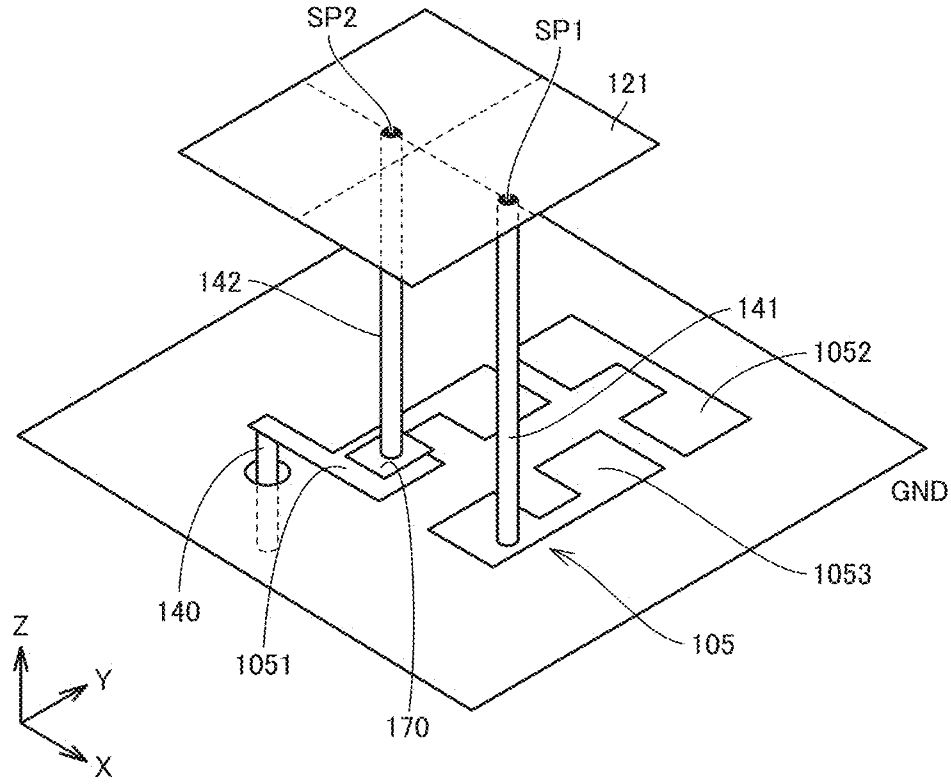
FIG. 3 is a perspective view of the antenna module of FIG. 1.

Next, a specific configuration of the antenna module 100 according to Embodiment 1 is described with reference to FIGS. 2 and 3. FIG. 2 is a side see-through view of the antenna module 100. FIG. 3 is a perspective view of the antenna module 100. Note that, for ease of illustration, a dielectric substrate 130 and the RFIC 110 are omitted from FIG. 3.

With respect to FIGS. 2 and 3, the antenna module 100 will be now described as having one radiating element 121. However, as described with respect to FIG. 1, the antenna module 100 may be an array antenna in which multiple radiating elements are arranged in a one-dimensional array or two-dimensional array.

In addition to the radiating element 121 and the RFIC 110, the antenna module 100 includes a dielectric substrate 130, feeding lines 140, 141, and 142, a filter device 105, and a ground electrode GND. Note that, in the following description, Z-axis direction is a normal direction of the dielectric substrate 130 (a direction in which a radio wave is emitted), and X axis and Y axis define a surface perpendicular to Z-axis direction. Moreover, the positive direction of Z axis in each figure may also be referred to as an upward direction, and the negative direction of Z axis may also be referred to as a downward direction.

The dielectric substrate 130 is, for example, a low temperature co-fired ceramics (LTCC) multilayer substrate, a multilayer resin substrate formed by stacking multiple resin layers each composed of a resin such as epoxy or polyimide, a multilayer resin substrate formed by stacking multiple resin layers each composed of a liquid crystal polymer (LCP) having a lower dielectric constant, a multilayer resin substrate formed by stacking multiple resin layers each composed of a fluorine resin, or a ceramic multilayer substrate, other than LTCC. Note that the dielectric substrate 130 is not necessarily limited to a multilayer structure, and may be a monolayer substrate.

The dielectric substrate 130 has a generally rectangular shape, and the radiating element 121 is disposed on an upper surface 131 (the surface in the positive direction of Z axis) or in an inner layer of the dielectric substrate 130. A ground electrode GND having a plate shape is disposed in a layer closer to a lower surface 132 (the surface in the negative direction of Z axis) than the radiating element 121 in the dielectric substrate 130. The ground electrode GND faces the radiating element 121. The RFIC 110 is mounted on the lower surface 132 of the dielectric substrate 130 via solder bumps 160. Note that the RFIC 110 may be connected to the dielectric substrate 130, using a multipole connector, instead of the solder connection.

The RFIC 110 is connected to the filter device 105 by the feeding line 140. The filter device 105 is a so-called resonant line filter and includes three line resonators 1051, 1052, and 1053. The resonators 1051, 1052, and 1053 are each formed of a plate electrode having a generally C shape, as shown in FIG. 3. The resonators 1051, 1052, and 1053 each have an electrical length of λ/2, where λ is a wavelength of a high-frequency signal supplied from the RFIC 110 to the radiating element 121. The resonators 1051, 1052, and 1053 are arranged in such a manner that they are electromagnetically coupled.

The resonators 1051, 1052, and 1053 are disposed, spaced apart from each other in the same layer of the dielectric substrate 130, for example, as shown in FIG. 3. More specifically, the resonator 1051 and the resonator 1053 are disposed so that a C-shaped recess of the resonator 1051 and a C-shaped recess of the resonator 1053 face each other. The resonator 1052 is disposed so as to face end portions (first end portions) of the resonators 1051 and 1053. Note that the resonators may not necessarily be disposed in the same layer, insofar as they can be electromagnetically coupled together. As used herein, "electrically coupled" can mean directly (physically) coupled with a conductor or waveguide, or "electromagnetically coupled" which does not have a physical connection. The electromagnetic coupling may include magnetic coupling, electric coupling, or both. For example, the resonator 1052 may be disposed in a layer different from a layer in which the resonator 1051 and the resonator 1053 are disposed, as shown in FIG. 2.

The resonator 1051 has a second end portion connected to the feeding line 140, the second end portion being opposite the first end portion facing the resonator 1052. The feeding line 140 extends from the RFIC 110, passing through the ground electrode GND, and is connected to the resonator 1051. The resonator 1053 has a second end portion connected to the feeding line 141 formed as a vertical section of a via, the second end portion being opposite the first end portion facing the resonator 1052. The feeding line 141 is connected to a feed point SP1 of the radiating element 121.

A high-frequency signal, supplied from the RFIC 110 to the resonator 1051 by the feeding line 140, passes through the resonator 1051, the resonator 1052, the resonator 1053 and the feeding line 141, and is supplied to the feed point SP1 of the radiating element 121. As mentioned above, the resonators 1051, 1052, and 1053 have the same electrical length and resonate at the same resonance frequency. Therefore, by the high-frequency signal passing through the resonator 1051, the resonator 1052 and the resonator 1053, a signal having a desired frequency range can be supplied to the radiating element 121.

The radiating element 121 has the feed point SP1 disposed at a location offset the center of the radiating element 121 in the positive direction of X axis. Accordingly, as a high-frequency signal is supplied to the feed point SP1, the radiating element 121 emits a radio wave that has X-axis direction as the polarization direction.

The second end portion of the resonator 1051 faces an electrode 170 formed at an end portion of the feeding line 142 formed of a via. The feeding line 142 is connected to a feed point SP2 of the radiating element 121. In other words, the resonator 1051 and the radiating element 121 are so-called "cross-coupled" in which the resonator 1051 is directly coupled to the radiating element 121, in contrast to a path (a primary path) for being coupled to the radiating element 121 by way of the resonator 1052 and the resonator 1053. The "cross-coupling" refers to coupling of non-adjacent resonators.

In the "cross-coupling" of the resonator 1051 and the radiating element 121, the second end portion of the resonator 1051 and the electrode 170 are electromagnetically coupled. Therefore, the cross-coupling of the resonator 1051 and the radiating element 121 has a low degree of electrical coupling, as compared to the direct connection of the resonator 1053 and the radiating element 121 through the vertical section of the via.

While, in the antenna module 100 according to Embodiment 1, the resonator 1051 and the feeding line 142 are wirelessly, electromagnetically coupled, and the radiating element 121 and the feeding line 142 are directly connected at the feed point SP2, it should be noted that, conversely, the resonator 1051 and the feeding line 142 may be directly connected, and the radiating element 121 and the feeding line 142 may be wirelessly, electromagnetically coupled. Alternatively, the radiating element 121 and the feeding line 142 may be wirelessly, electromagnetically coupled via the feeding line 142, and the resonator 1051 and the feeding line 142 may also be electromagnetically coupled via the feeding line 142.

Even if the radiating element 121 and the feeding line 142 are directly connected and the resonator 1051 and the feeding line 142 are directly connected, a degree of coupling of the resonator 1051 and the radiating element 121 can be made weaker than a degree of coupling of the resonator 1053 and the radiating element 121, depending on the arrangement of the feed point SP2. The degree of electrical coupling of the resonator 1051 and the radiating element 121 is weaker than the degree of electrical coupling of the resonator 1053 and the radiating element 121 if the feed point SP1 is arranged closer to a peripheral edge of the radiating element 121 than the feed point SP2 is, on a straight line connecting the center of the radiating element 121 and the feed point SP1, as shown in FIGS. 2 and 3. This is because the radiating element 121 produces less electric field and less current flows through the radiating element 121 at the center of the radiating element 121, as compared to the peripheral edge of the radiating element 121.

While the filter device 105 is a three-stage resonant line filter having three resonators 1051 to 1053, the radiating element 121 can be used as a fourth-stage resonator by connecting the radiating element 121 to a resonator, other than the last-stage resonator, by "cross-coupling" as described above. In other words, three resonators 1051 to 1053 included in the filter device 105 and the radiating element 121 allows the filter device 105 to function as a four-stage resonant line filter.

An increase in number of stages of resonators included in a resonant line filter, generally, increases the attenuation pole, thereby increasing the steepness of attenuation at the end portion of a pass band. However, an increase in number of stages of resonators also extends the path through which a high-frequency signal passes, which, in turn, results in an increased loss.

The antenna module 100 according to Embodiment 1 allows the radiating element 121 to be used as a resonator of a filter, as described above. Thus, attenuation characteristics equivalent to those obtained from a filter having four stages of resonators can be achieved by using three stages of resonators. Furthermore, since the antenna module 100 according to Embodiment 1 has a reduced number of stages of resonators, a high-frequency signal passing through the resonators causes less loss.

Note that the resonator 1051 according to Embodiment 1 corresponds to a "first resonator" according to the present disclosure, and the resonator 1053 according to Embodiment 1 corresponds to a "second resonator" according to the present disclosure.

(Comparing of Antenna Characteristics)

Next, the antenna characteristics of the antenna module 100 according to Embodiment 1 are compared with antenna characteristics according to Comparative Example in which a four-stage resonant line filter and a radiating element are combined.

Figure 4:
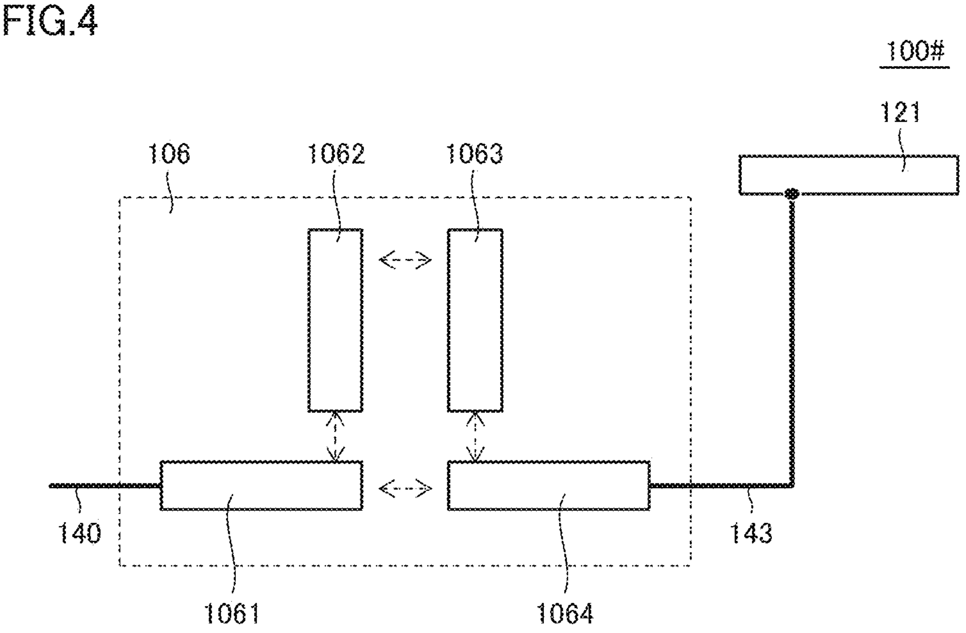
FIG. 4 is a diagram for illustrating a configuration of an antenna module according to Comparative Example.

FIG. 4 is a diagram for illustrating a configuration of an antenna module 100# according to Comparative Example. The antenna module 100# has a configuration in which a radiating element 121 is connected to a four-stage resonant line filter device 106 which includes four resonators 1061, 1062, 1063, and 1064. The resonators 1061 to 1064 are each formed as a generally-rectangular electrode having an electrical length of λ/2.

The initial-stage resonator 1061 has one end connected to a feeding line 140, through which the initial-stage resonator 1061 is supplied with a high-frequency signal from an RFIC 110 through the feeding line 140. The resonator 1061 has the other end facing one end of the fourth-stage (the final-stage) resonator 1064. The resonator 1061 and the resonator 1064 are disposed so as to extend in the same direction. The resonator 1064 has the other end connected to the radiating element 121 via a feeding line 143.

The second-stage resonator 1062 has one end facing a side surface of the other end of the resonator 1061. The third-stage resonator 1063 is disposed facing a side surface of the one end of the resonator 1064. The resonator 1062 and the resonator 1063 extend in the same direction orthogonal to the extension directions of the resonator 1061 and the resonator 1064, and have side surfaces facing each other.

Arranging the resonators 1061 to 1064 in such a manner produces cross-coupling of the resonator 1061 and the resonator 1064, in addition to the coupling of the path passing through the resonator 1061, the resonator 1062, the resonator 1063, and the resonator 1064 in the listed order. This allows the filter device 106 to function as a four-stage resonant line filter.

For the configuration in which the filter device 106 and the radiating element 121, which is an antenna, are simply combined like the antenna module 100#, the filter device 106 and the antenna are, typically, designed so that their characteristics are individually optimal. In this case, combining the filter device 106 and the antenna does not necessarily produce optimal characteristics of the antenna module as a whole.

Figure 5:
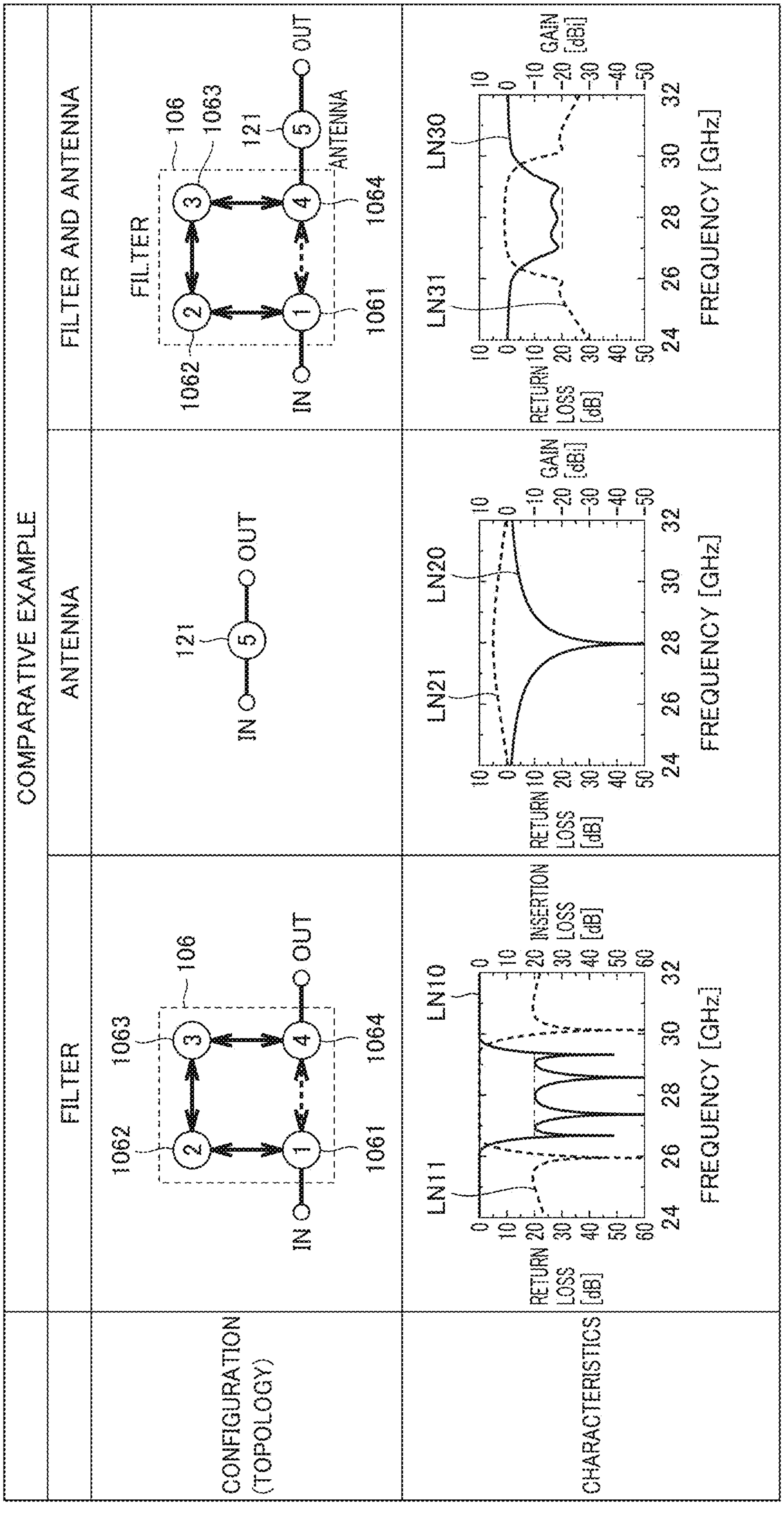
FIG. 5 is a diagram for illustrating antenna characteristics according to Comparative Example.

FIG. 5 is a diagram for illustrating antenna characteristics of the antenna module 100# according to Comparative Example. The top row of FIG. 5 schematically shows a configuration of a filter alone, a configuration of an antenna alone, and a configuration in which the filter and the antenna are combined. The bottom row of FIG. 5 shows results of simulation of characteristics (a return loss, an insertion loss, a gain) obtained by the respective configurations.

Note that the configurations provided on the top row of FIG. 5 describe the resonators 1061 to 1064 and the radiating element 121 as numbered nodes. Specifically, the resonator 1061, the resonator 1062, the resonator 1063, and the resonator 1064 correspond to "NODE 1," "NODE 2," "NODE 3," and "NODE 4," respectively, and the radiating element 121 corresponds to "NODE 5." The output (OUT) of the radiating element 121 corresponds to a free space.

In the bottom row of FIG. 5, a solid line LN10 indicates a return loss, and a dashed line LN11 indicates an insertion loss in the graph of characteristics of the filter device 106. Solid lines LN20 and LN30 indicate return losses and dashed lines LN21 and LN31 indicate antenna gains in the graphs of characteristics of the antenna (the radiating element 121) and the antenna module as a whole, respectively.

In the graph of characteristics of the filter device 106, the return loss in a target pass band (27 to 29 GHz) is less than the design specifications which is 20 dB (the solid line LN10), and the insertion loss in the pass band is approximately zero dB (the dashed line LN11). In other words, the filter device 106 is optimally designed for the target pass band. The radiating element 121 is tuned so as to have a minimum return loss (the dashed line LN21) and a maximum antenna gain (the solid line LN20) in the center frequency of 28 GHz.

However, after the filter device 106 and radiating element 121, thus tuned, are combined, the antenna gain (the dashed line LN31) is maximum, but the return loss (the solid line LN30) is greater than 20 dB in the target pass band.

Figure 6:
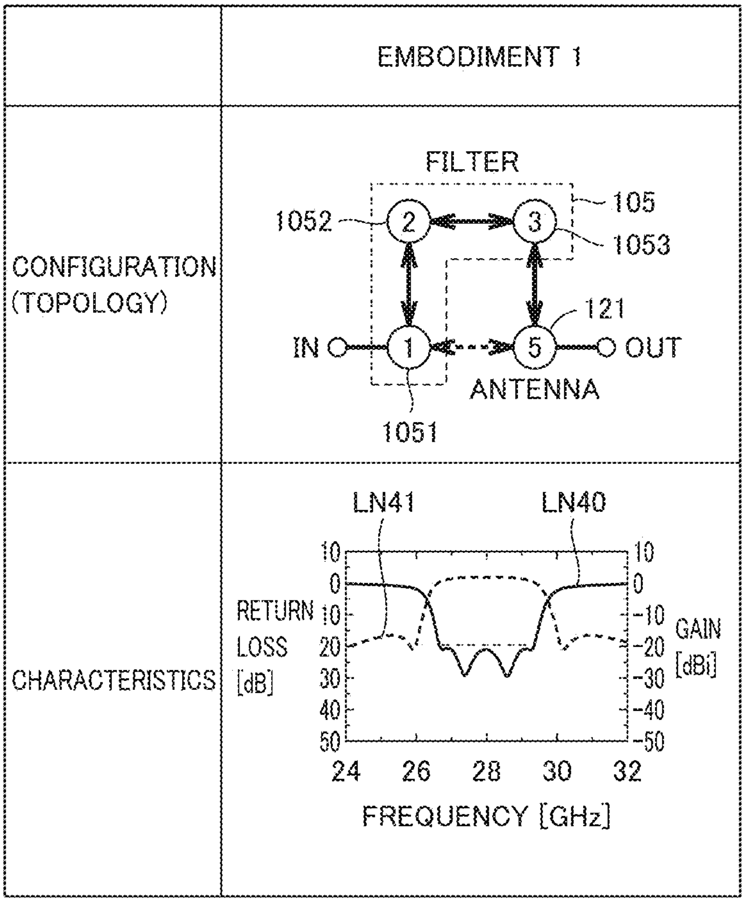
FIG. 6 is a diagram for illustrating antenna characteristics according to Embodiment 1.

The resonator 1064 (NODE 4) according to Comparative Example corresponds to the radiating element 121 according to Embodiment 1, as shown in FIG. 6. The antenna module 100 according to Embodiment 1 includes the radiating element 121 as part of the filter. Consequently, the characteristics of the antenna module 100 are tuned at the design phase, taking into account both the filter and the antenna.

As shown in the bottom row of FIG. 6, it can be recognized that the antenna module 100 according to Embodiment 1 achieves the antenna gain in the target pass band as much as in Comparative Example of FIG. 5, and, additionally, achieves a return loss less than 20 dB. Note that the antenna module 100 according to Embodiment 1 also achieves the steepness of attenuation at the end portion of the pass band as much as in Comparative Example.

In this way, the radiating element is caused to function as a resonator of the filter and the characteristics of the antenna module 100 are tuned in unison, taking into account both the filter and the antenna, thereby enhancing the steepness of attenuation of the filter by adding an attenuation pole, even though the filter has a less number of resonators. Furthermore, the total number of resonators is reduced, thereby achieving size reduction of the antenna module as a whole and reduction of loss caused by a high-frequency signal passing through the resonators.

While, in the example above, the three-stage resonant line filter and the radiating element are combined and caused to function as a four-stage filter, the resonant line filter may be a four or higher stage resonant line filter. In other words, by combining an n-stage (n is an integer greater than or equal to 3) resonant line filter and a radiating element and causing them to function as a (n+1) stage filter, attenuation characteristics equivalent to those of a (n+1) stage filter can be achieved, while achieving size reduction and reduced loss as compared to using a (n+1) stage filter.

Moreover, while, in the example above, the first-stage resonator and the radiating element are cross-coupled, a resonator other than the first-stage resonator (the second-stage resonator in the case of a three-stage filter) and the radiating element may be cross-coupled.

(Variation)

The coupling of resonators and the coupling of a resonator and a radiating element include "magnetic coupling" and "electric coupling." Therefore, even if filters have the same contour, characteristics of the filters can be different, depending on whether the coupling is magnetic coupling or electric coupling, that is, depending on a coupling topology.

Figure 7:
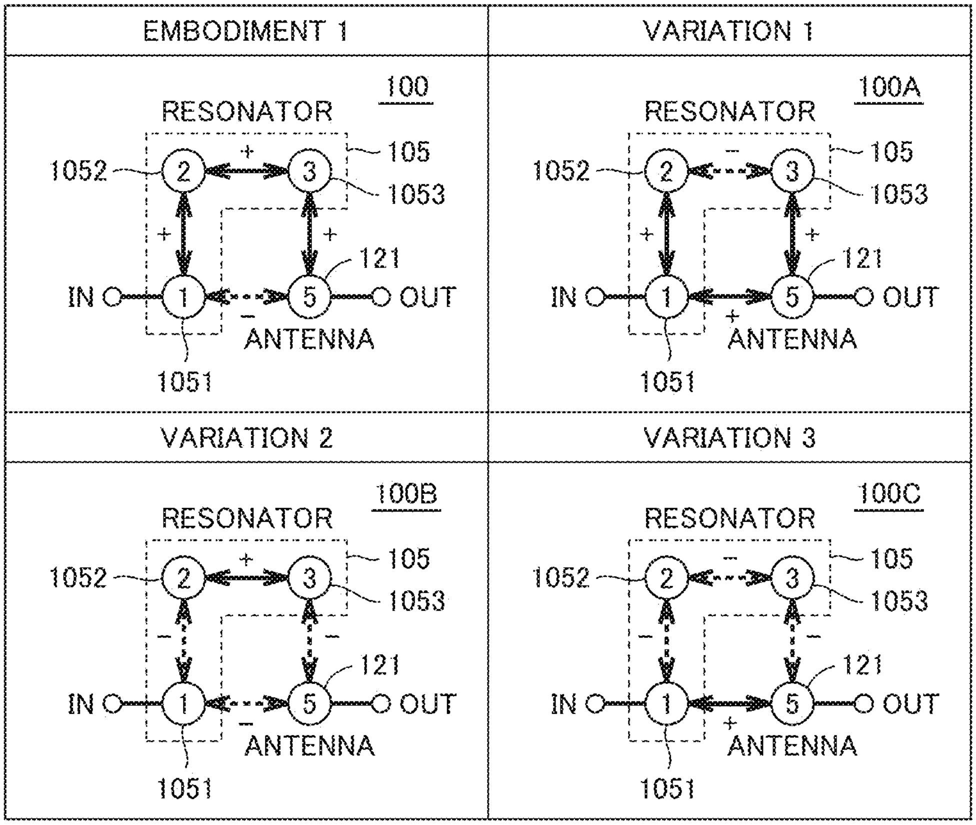
FIG. 7 is a diagram for illustrating an antenna module according to Variation.

Conversely, the filters may achieve the same frequency response, even if they have different coupling topologies. In the following, Variations of the coupling topology are described, with reference to FIG. 7, which can achieve the same frequency response as the antenna module 100 according to Embodiment 1. FIG. 7 shows configurations of an antenna module 100A (Variation 1), an antenna module 100B (Variation2), and an antenna module 100C (Variation 3), in addition to the configuration of the antenna module 100 according to Embodiment 1. In FIG. 7, solid arrows and dashed arrows represent coupling of nodes, where the solid arrows indicate "magnetic coupling" and the dashed arrows indicate "electric coupling." A coupling coefficient of the electric coupling and a coupling coefficient of the electric coupling have opposite signs. Thus, in the present disclosure, the magnetic coupling will also be referred to as a positive coupling whose coupling coefficient has a positive (+) sign, and the electric coupling will also be referred to as a negative coupling whose coupling coefficient has a negative (−) sign.

In the antenna module 100 according to Embodiment 1, a cross-coupling, that is, the coupling of the resonator 1051 and the radiating element 121 is a negative coupling, and couplings along the primary path are positive couplings.

In the antenna module 100A according to Variation 1, the coupling of the resonator 1052 and the resonator 1053 is a negative coupling, and the other couplings are positive couplings. In the antenna module 100B according to Variation 2, the coupling of the resonator 1052 and the resonator 1053 is a positive coupling, and the other couplings are negative couplings. In the antenna module 100C according to Variation 3, the cross-coupling is a positive coupling, and the other couplings are negative couplings.

In other words, in any of Embodiment 1 and Variations 1 to 3 thereof, the sign obtained by multiplying the signs of the coupling coefficients of the couplings along the primary path passing through the resonators 1051 to 1053 to the radiating element 121 differs from the sign of the coupling coefficient of the cross-coupling. The characteristics as shown in FIG. 6 can be achieved by designing the coupling if the nodes in such a manner.

Embodiment 2

In Embodiment 1, a filter is disposed between the radiating element and the ground electrode. In this case, however, not only the feeding lines 141 and 142 formed in vertical sections of vias, but also the electrode, forming each resonator, itself may couple with the radiating element. In that case, the directivity or antenna characteristics of the antenna gain, etc. may be affected.

Embodiment 2 will be described, with reference to disposing a ground electrode between a radiating element and a filter to inhibit each resonator from unnecessarily coupling to the radiating element.

Figure 8:
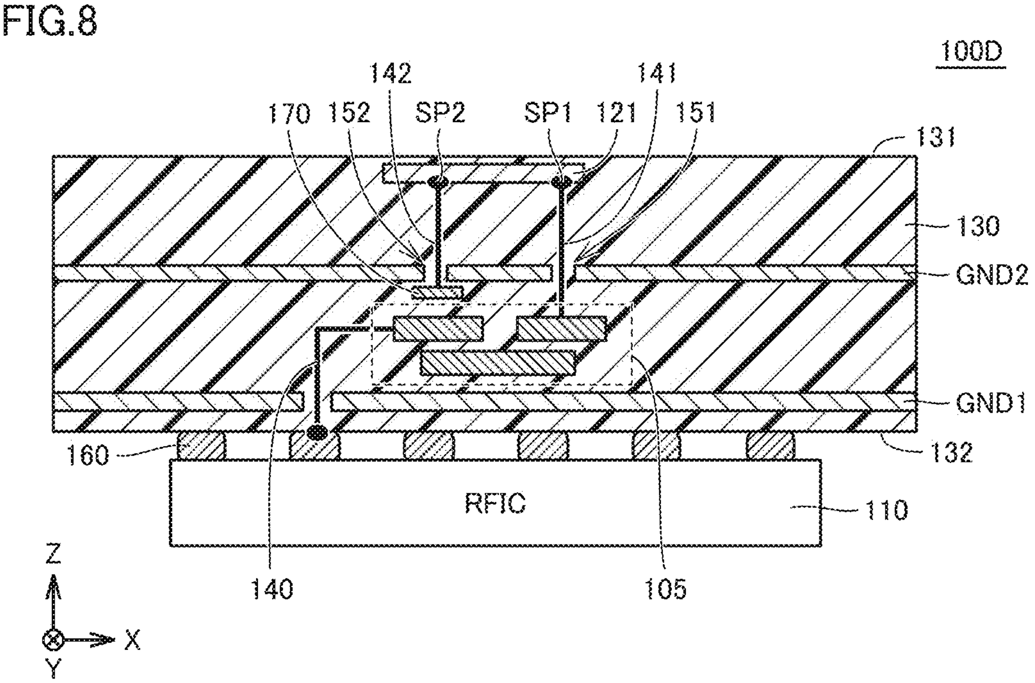
FIG. 8 is a side see-through view of an antenna module according to Embodiment 2 of the present disclosure.

FIG. 8 is a side see-through view of an antenna module 100D according to Embodiment 2. The antenna module 100D includes a ground electrode GND2 in a layer between a radiating element 121 and a filter device 105, in addition to a ground electrode GND1 disposed closer to a lower surface 132 of a dielectric substrate 130. Feeding lines 141 and 142 pass through the ground electrode GND2 and are connected to feed points SP1 and SP2, respectively, at the radiating element 121. The other configurations are the same as the antenna module 100 according to Embodiment 1, and descriptions of redundant elements will thus not be repeated.

Arranging the ground electrode GND2 in the layer between the radiating element 121 and the filter device 105 in this way causes the ground electrode GND2 to function as a shield, thereby inhibiting the respective resonators, constituting a filter device 105, from unnecessarily coupling to the radiating element 121.

In general, it is known that the spacing between the radiating element and the ground electrode is sensitive to the frequency bandwidth of a radio wave emitted by a radiating element. Specifically, the greater the spacing between the radiating element and the ground electrode is, the wider the frequency bandwidth is. Therefore, arranging the ground electrode GND2 in the layer between the filter device 105 and the radiating element 121, as with the antenna module 100D, may reduce the frequency bandwidth, as compared to the antenna module 100. If the spacing between the radiating element 121 and the ground electrode GND2 is equivalent to the spacing between the radiating element 121 and the ground electrode GND included in the antenna module 100, the dielectric substrate 130 as a whole has an increased thickness, which, in turn, may have a risk of hindering size reduction of the antenna module. Accordingly, whether to employ the configuration according to Embodiment 1 or the configuration according to Embodiment 2 is determined, as appropriate, taking into account the antenna characteristics such as the antenna gain, the loss, and the bandwidth, and the size of the antenna module.

Note that, if the configuration of the antenna module 100D according to Embodiment 2 is employed, a dielectric having a low dielectric constant may be used as the dielectric substrate 130 to prevent reduction in frequency bandwidth, caused by a reduced spacing between the radiating element and the ground electrode.

Embodiment 3

Embodiment 3 will be described, with reference to achieving electrical coupling of a filter and a radiating element by wireless, electromagnetically coupling, rather than directly connecting the filter and the radiating element using a feeding line (via) as with Embodiments 1 and 2.

Example 1

Figure 9:
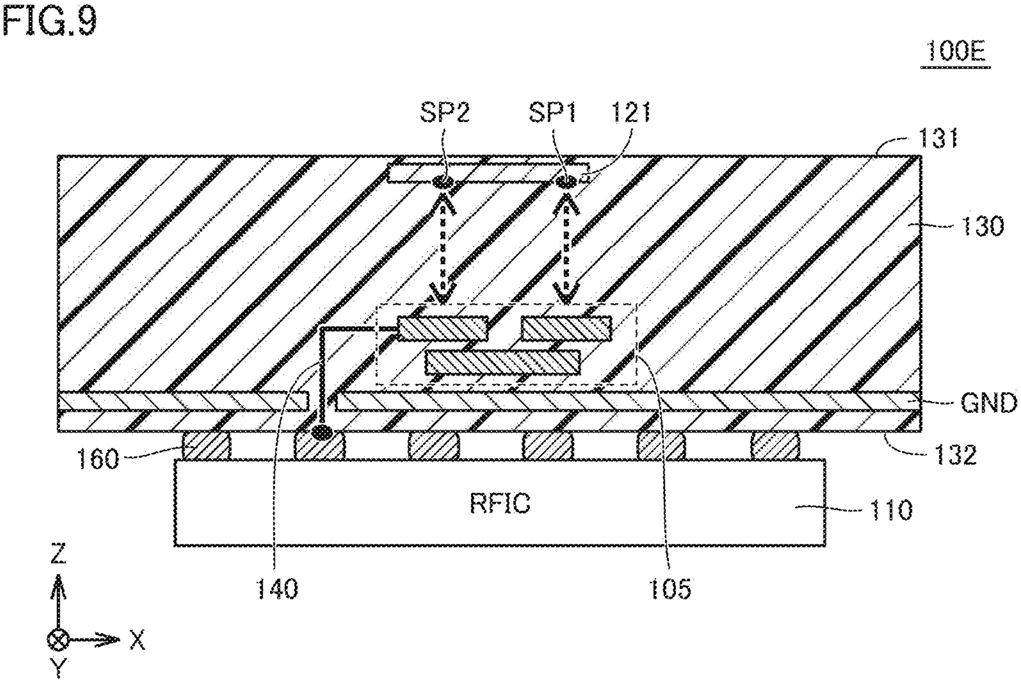
FIG. 9 is a side see-through view of an antenna module according to Example 1 of Embodiment 3 of the present disclosure.

FIG. 9 is a side see-through view of an antenna module 100E according to Example 1 of Embodiment 3. The antenna module 100E does not include the feeding lines 141 and 142 that are included in the antenna module 100 according to Embodiment 1. In the antenna module 100E, a resonator included in a filter device 105 and a radiating element 121 are wirelessly, electromagnetically coupled.

Note that, with the configuration of the antenna module 100E, because of the wireless coupling, a resonator to be coupled to the radiating element is arranged so that the centroid of the resonator overlaps a feed point when the dielectric substrate 130 is viewed from the top, thereby allowing supply of a high-frequency signal to a desired feed point. The degree of coupling of a filter and the radiating element can be timed by adjusting the location of the feed point or the distance between the radiating element 121 and the resonator.

Example 2

Figure 10:
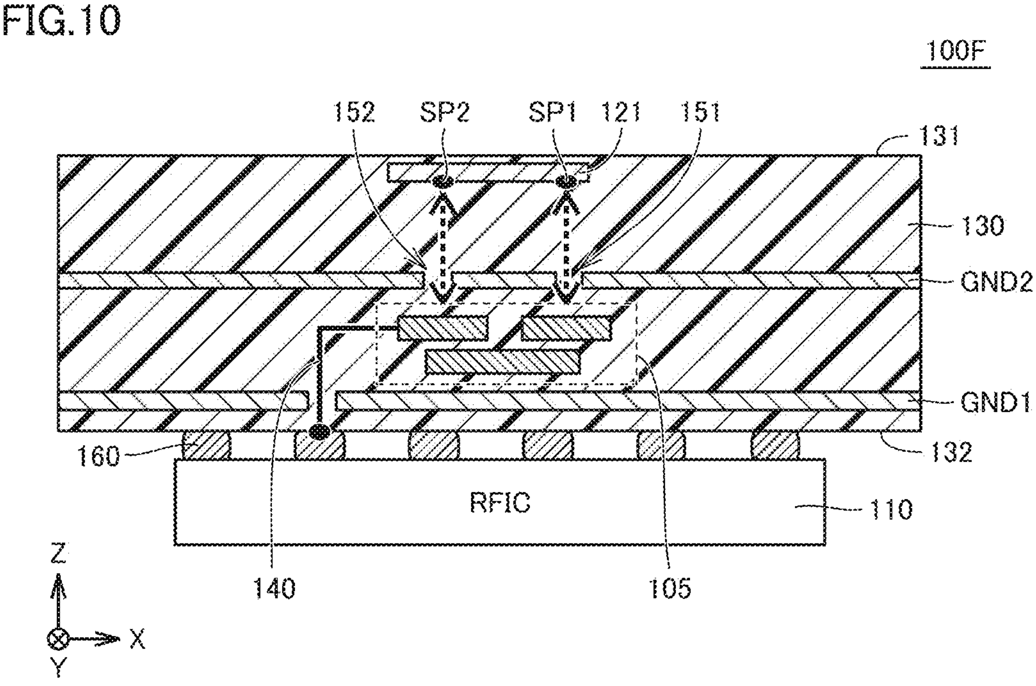
FIG. 10 is a side see-through view of an antenna module according to Example 2 of Embodiment 3 of the present disclosure.

FIG. 10 is a side see-through view of an antenna module 100F according to Example 2 of Embodiment 3. The antenna module 100F does not include the feeding lines 141 and 142 that are included in the antenna module 100E according to Embodiment 2, and a resonator included in a filter device 105 and a radiating element 121 are wirelessly, electromagnetically coupled.

In the antenna module 100F, a ground electrode GND2 is disposed between the filter device 105 and the radiating element 121. Thus, the ground electrode GND2 prevents the radiating element 121 and a resonator included in the filter device 105 from coupling together. Due to this, openings (slots) 151 and 152 are formed in the ground electrode GND2 at locations corresponding to feed points SP1 and SP2, respectively, at the radiating element 121. The slots 151 and 152 allow the radiating element 121 to couple to the resonator at a desired location in the radiating element 121. The degree of coupling of the radiating element 121 and the resonator can be tuned by adjusting the aperture sizes of the slots 151 and 152.

As described above, even when the radiating element and the resonator are wirelessly, electromagnetically coupled, by cross-coupling the radiating element and the resonator included in the filter and using the radiating element as a resonator of the filter, a reduced loss and attenuation characteristics equivalent to those of a filter having more resonators can be achieved by using a less number of resonators in the filter.

While the antenna modules shown in FIGS. 9 and 10 have been described in which the coupling (cross-coupling) of the resonator 1051 and the radiating element 121 and the coupling of the resonator 1053 and the radiating element 121 are wireless, electromagnetic couplings, one of the two may be a coupling by direct connection using a feeding line (via), and the other of the two may be a wireless, electromagnetic coupling.

While the embodiments have been described above in which the patch antenna having the planar shape is used as the radiating element, a linear antenna or a slot antenna may also be applicable as the radiating element. The patch antenna is not limited to have a generally square shape, and may have a polygonal shape, a round shape, an oval shape, or a shape a portion of which is cut out.

The presently disclosed embodiments should be considered in all aspects as illustrative and not restrictive. The scope of the present disclosure is defined by the appended claims, rather than by the description of the embodiments above. All changes which come within the meaning and range of equivalency of the appended claims are to be embraced within their scope.

REFERENCE SIGNS LIST

10 communication device; 100, 100A to 100F antenna module; 105, 106 filter device; 105A to 105D filter; 110 RFIC; 111A to 111D, 113A to 113D, 117 switch; 112AR to 112DR low-noise amplifier; 112AT to 112DT power amplifier; 114A to 114D attenuator; 115A to 115D phase shifter; 116 signal multiplexer/demultiplexer; 118 mixer; 119 amplifier circuit; 120 antenna device; 121 radiating element; 130 dielectric substrate; 131 upper surface; 132 lower surface; 140 to 143 feeding line; 151, 152 slot; 160 solder bump; 170 electrode; 1051 to 1053, 1061 to 1064 resonator; 200 BBIC; GND, GND1, GND2 ground electrode; and SP1, SP2 feed point.

The invention claimed is:

1. An antenna module, comprising:
a radiating element; and
a filter device including a plurality of resonators, wherein
the plurality of resonators include a first resonator and a second resonator, the second resonator being disposed at a final stage,
the first resonator and the second resonator are each electrically coupled to the radiating element, and
a degree of coupling between the first resonator and the radiating element is weaker than a degree of coupling between the second resonator and the radiating element.

2. The antenna module according to claim 1, wherein
the second resonator is directly connected to the radiating element by a vertical section of a via.

3. The antenna module according to claim 2, wherein
the first resonator is wirelessly, electromagnetically coupled to the radiating element via another vertical section of another via.

4. The antenna module according to claim 1, wherein
the first resonator is wirelessly, electromagnetically coupled to the radiating element.

5. The antenna module according to claim 4, wherein
the second resonator is wirelessly, electromagnetically coupled to the radiating element.

6. The antenna module according to claim 1, further comprising:
a ground electrode disposed between the radiating element and the filter device, the ground electrode facing the radiating element.

7. The antenna module according to claim 2, further comprising:

a ground electrode disposed between the radiating element and the filter device, the ground electrode facing the radiating element.

8. The antenna module according to claim 3, further comprising:

a ground electrode disposed between the radiating element and the filter device, the ground electrode facing the radiating element.

9. The antenna module according to claim 4, further comprising:

a ground electrode disposed between the radiating element and the filter device, the ground electrode facing the radiating element.

10. The antenna module according to claim 5, further comprising:

a ground electrode disposed between the radiating element and the filter device, the ground electrode facing the radiating element.

11. The antenna module according to claim 4, further comprising:

a ground electrode disposed between the radiating element and the filter device, and the ground electrode facing the radiating element, wherein the ground electrode includes a slot between the radiating element and a resonator that is wirelessly, electromagnetically coupled to the radiating element among the plurality of resonators.

12. The antenna module according to claim 5, further comprising:

a ground electrode disposed between the radiating element and the filter device, and the ground electrode facing the radiating element, wherein the ground electrode includes a slot between the radiating element and a resonator that is wirelessly, electromagnetically coupled to the radiating element among the plurality of resonators.

13. The antenna module according to claim 1, further comprising:

a ground electrode that faces the radiating element, wherein the filter device is disposed between the radiating element and the ground electrode.

14. The antenna module according to claim 1, wherein couplings of the plurality of resonators and a coupling of the radiating element and a resonator are any of a magnetic coupling and an electric coupling, and a sign obtained by multiplying signs of coupling coefficients of couplings along a path passing through the plurality of resonators to the radiating element differs from a sign of a coupling coefficient of the coupling of the first resonator and the radiating element, where the magnetic coupling has a coupling coefficient having a positive sign and the electric coupling has a coupling coefficient having a negative sign.

15. The antenna module according to claim 1, further comprising a power feeding circuit that supplies the radiating element with a radio-frequency signal.

16. An antenna module, comprising:

a radiating element; and a filter device that includes a plurality of resonators, wherein the plurality of resonators includes a first resonator and a second resonator, the second resonator being disposed at a final stage of the filter device, and the first resonator is wirelessly, electromagnetically coupled to the radiating element via a vertical section of a via, and the second resonator is directly connected to the radiating element by another vertical section of another via.

17. The antenna module according to claim 16, further comprising a power feeding circuit that supplies the radiating element with a radio-frequency signal.

18. An antenna module, comprising:

a radiating element;

a filter device that includes a plurality of resonators; and a ground electrode disposed between the radiating element and the filter device, the ground electrode facing the radiating element, wherein the plurality of resonators includes a first resonator and a second resonator, the second resonator being disposed at a final stage of the filter device, the first resonator is wirelessly, electromagnetically coupled to the radiating element via a first slot formed in the ground electrode, and the second resonator is wirelessly, electromagnetically coupled to the radiating element via a second slot formed in the ground electrode, the first slot has a smaller size than the second slot.

19. The antenna module according to claim 18, further comprising:

a power feeding circuit that supplies the radiating element with a radio-frequency signal.

20. A communication device comprising:

the includes antenna module according to claim 1.

* * * * *